Feb. 18, 1947. M. B. HEFTLER 2,415,881
OVERLAPPING JOINT
Filed Oct. 20, 1943 2 Sheets-Sheet 1
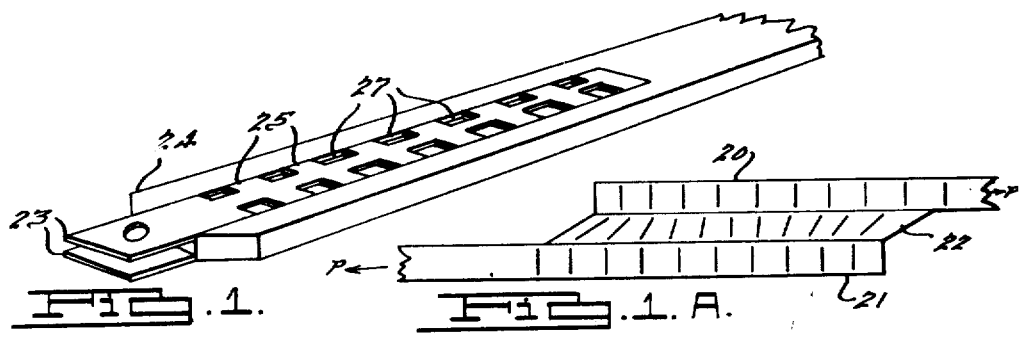
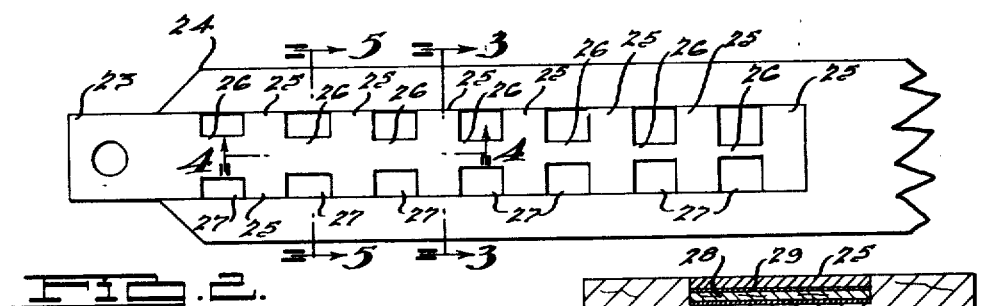
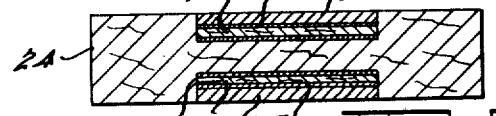
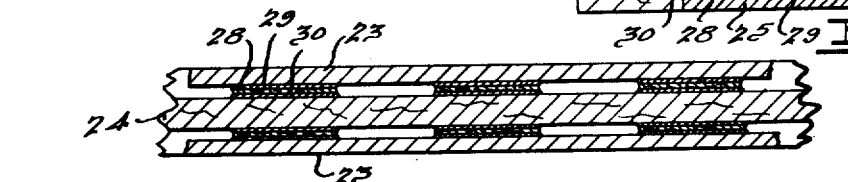
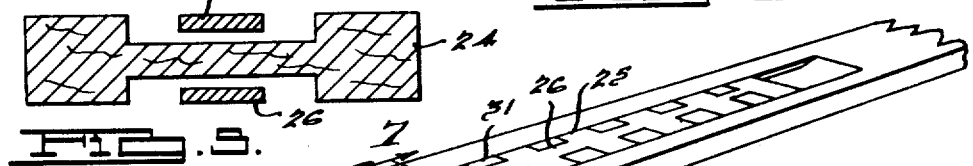
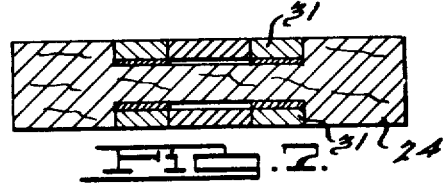
INVENTOR
Maurice B. Heftler.
BY Harris & Harris
ATTORNEYS

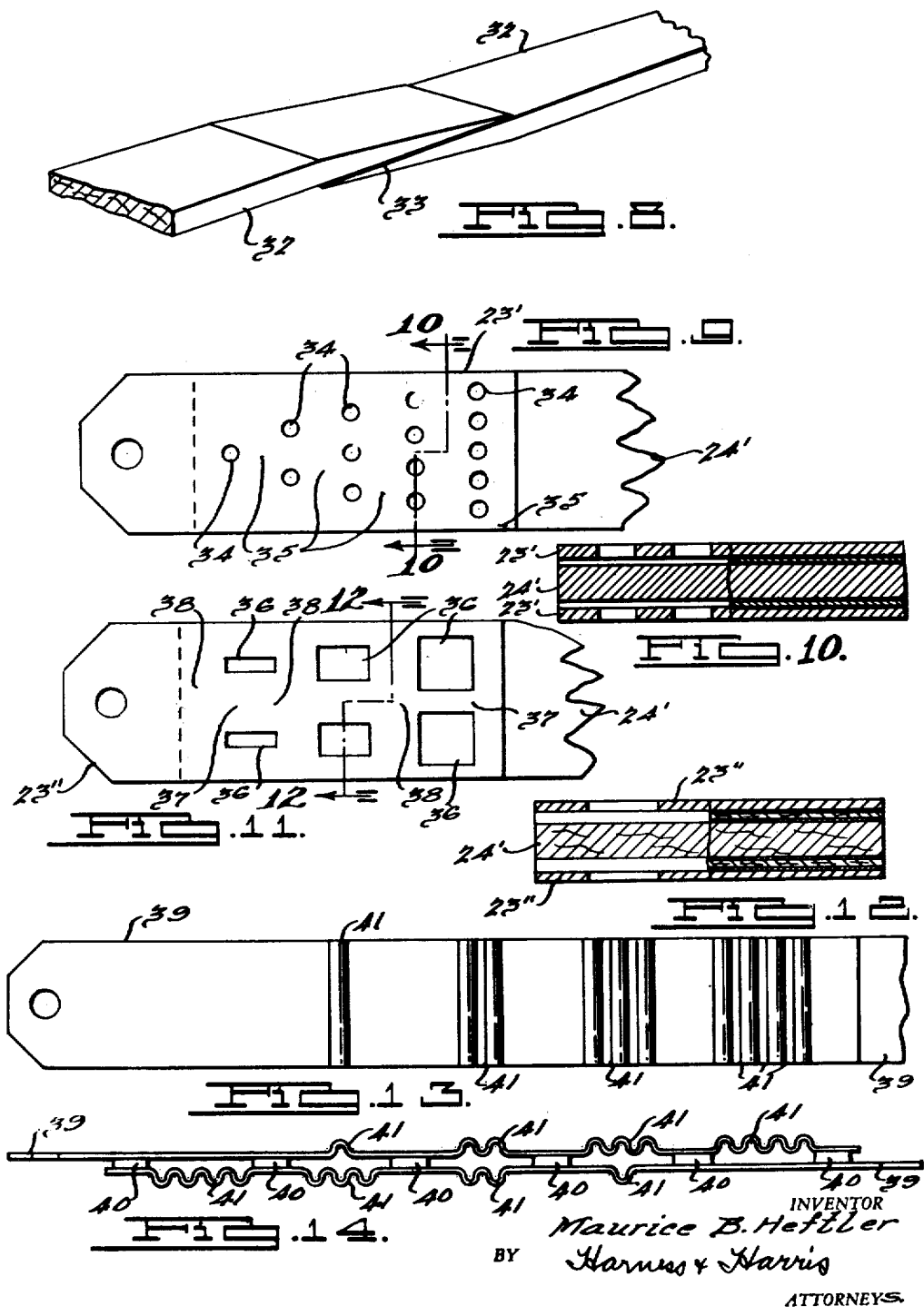

Patented Feb. 18, 1947

2,415,881

UNITED STATES PATENT OFFICE 2,415,881

OVERLAPPING JOINT

Maurice B. Heftler, Grosse Pointe, Mich., assignor to Chrysler Corporation, Highland Park, Mich., a corporation of Delaware Application October 20, 1943, Serial No. 506,974

9 Claims. (Cl. 20—92)

This invention relates to improvements in joints and especially in joints between members having overlapping parts.

An object of the invention is the provision of a joint of the foregoing type having improved load transfer and stress distributing characteristics and wherein the overlapping parts are bonded together and so shaped one relative to the other as to bring the stresses to which the bond is subjected to substantially the same value at all points of the joint; and to provide a joint of the foregoing type for connecting members having different moduli of elasticity.

Another object of the invention is to provide a load transferring joint between members having overlapping parts bonded together in which either one or both of the parts are so shaped that the elastic deformability at successive selected sections increases as the load transferred to or from that member decreases in order to produce uniform elastic deflection at the successive selected sections even though the increment of load transferred at such sections differs.

A still further object of the invention is the provision of a joint between members having different moduli of elasticity and overlapping parts bonded together in which the parts are so proportioned in section as to bring the stresses to which the bond is subjected to substantially the same value at all portions of the joints; and to provide an overlapped joint between members having the foregoing characteristics in which the parts of the overlap are bonded together at selective zones arranged alternately with respect to relatively elastically deformable selected zones, the area of the deformable zones of that part having the higher modulus of elasticity decreasing from a maximum at one end of the overlap to a minimum at the other end of the latter.

Fig. 1a is a side elevational view of a typical prior art joint of the overlapping type illustrating, in somewhat exaggerated form, the magnitude of shear stress in the bonding layer or film.

Fig. 1 is a view in perspective of an overlap joint embodying the invention.

Fig. 2 is a plan view of the joint shown in Fig. 1.

Figs. 3, 4, and 5 are enlarged sectional views taken on the line 3—3, 4—4, and 5—5, respectively of Fig. 2.

Fig. 6 is a view similar to Fig. 1 but showing a further embodiment of the invention.

Fig. 7 is an enlarged section taken on line 7—7 of Fig. 5.

Fig. 8 is a fragmentary perspective view showing a further embodiment of the invention.

Fig. 9 is a plan view similar to Fig. 2 but showing another modified form of the invention.

Fig. 10 is an enlarged section taken on line 10—10 of Fig. 9.

Fig. 11 is a plan view similar to Fig. 9 but embodying a further modification of the invention.

Fig. 12 is a sectional view taken on line 12—12 of Fig. 11.

Fig. 13 is a view similar to Fig. 10 embodying a still further modification of the invention.

Fig. 14 is an enlarged sectional view taken on line 14—14 of Fig. 12.

Referring to Fig. 1a the pieces 20 and 21 are shown connected together by a film or layer of a bonding medium 22 therebetween, the joint thus formed being of the typical prior art type and being illustrated under load. The magnitude of shear stress in the medium 22 is indicated by the deviations from perpendicular of the lines drawn on the bonding medium. As load is applied there is longitudinal displacement between the pieces 20, 21 which sets up a shear stress in the medium 22 and effects a transfer of load from one of the pieces to the other. There is elongation under load within the pieces themselves, the elongation in each piece being greatest where the load remaining in the piece is greatest. Thus, elongation in the top piece 20 must be greatest at the right end of the joint, as viewed in Fig. 1a, inasmuch as this piece carries more and more of the load as movement to the right occurs. Likewise, the elongation of the bottom piece 21 is greatest at the left end of the joint. Generally, the elongation at all places, except in the mid-portion of the joint, in one of the pieces is different from the elongation at opposing places in the other piece. The difference in elongation being greatest at the ends of the joint causes maximum shear stress in the medium 22 at the ends of the joint with a minimum at the mid-point of the joint.

An object of the invention, therefore, is to provide a joint wherein the presence of localized maximum and minimum shear stresses are avoided.

Referring to Figs. 1 to 5, there is shown an improved overlapping joint between metallic members 23 and a wood member 24, in the specific embodiment two members 23 being employed to provide symmetrical loading and to eliminate tendency of the structure to bow by reason of eccentric loading. The members 23 are similar in construction and in attachment to the member 24. While two members 23 are shown, it will nevertheless be understood that a single one may be employed in conjunction with the member 24 or a series of successive members 23, as 24 may be embodied in a structure. If desired, the members 23 may not be attached at their free ends to such further member or members (not shown) with which it is desired to operatively connect the wood member 24.

Each member 23 consists of a plurality of successive attaching areas or pads 25, adjacent pads being connected by a neck 26 formed integral therewith. The area of the necks 26 decrease from left to right as viewed in Fig. 2 while the area of the pads 25 is substantially constant throughout the member. The members 23 may be formed by suitably removing portions thereof as indicated at 27 from a piece of stock, such portions being removed from opposite sides of each neck 26.

The member 24 is recessed to receive the members 23 and each pad 25 of the latter has bonded thereto a wooden shim 28 by a layer or film 29, hereinafter more fully set forth, and each shim is secured to the member 24 by a layer or film of adhesive 30.

The layer of film 29 may comprise a heat hardening cement which either thermosets or vulcanizes to a solid state and which is adapted to bond metal to wood. A cement of the type which is particularly adapted for use in connection with this invention is fully disclosed in application Serial No. 466,062 filed in the names of Seymour G. Saunders and Harry Morrison. A preferred composition of one of the components of the cement is set forth in lines 8 to 14 of page 3 of said application and may be used as modified in paragraph 1 of page 4. The preferred synthetic resin component of the cement is set forth in the second sentence of page 6 of said application. Inasmuch as the above application has been placed under secrecy by the U. S. Government, no details of the composition can be or are herein set forth and reliance is made upon the disclosure in said application. This cement can be satisfactorily cured at a temperature of approximately 325° F. for a period of fifteen minutes.

A cement of the foregoing character can be applied to surfaces of the parts by spraying, flowing, or brushing operations and allowed to dry without becoming irreversibly set prior to assembly of the parts by subjecting the cement deposits to an atmosphere which causes evaporation of the solvent or vehicle thereof and deposition of the solids of the cement. By following this procedure flow of the cement between the parts is prevented when the cement is compressed therebetween during the setting operation.

After application of the cement of the layer 29 to either or both the shim 28 and members 23, as aforesaid, the same are placed in superimposed relation and firmly pressed together in any suitable manner simultaneously with the application of a curing temperature to the cement. The efficiency of the bond provided by the cement is dependent upon uniform and intimate contact of adjacent surfaces and while the metallic part may be relatively rigid, nevertheless the shim 28 readily conforms to any irregularities present in the metallic or rigid members 23 with a minimum of pressure force and thus an efficient bond is provided. The shim 28 being relatively thin, the reaction thereof to the cement curing temperature does not materially affect the bond by setting up a permanent tension in the layer 29, for example, and neither is the body of the washer distorted by this reaction. The bond so provided is characterized by relatively high shear strength and a degree of resiliency or elasticity which resists impact shocks.

As further examples, the layer or films 29 may be of the following types, each of which has good bonding properties:

1. Hot press phenolic glues. These comprise phenol formaldehyde, urea formaldehyde and/or cresyl formaldehyde condensation products having an acid hardener curing accelerator.

2. Blood phenolic types, as phenol formaldehyde condensation products modified with whole blood or blood albumin.

The film or layer 30 between the shim 28 and member 24 is preferably an adhesive having a relatively low setting temperature and for this purpose any of the well known animal or thermoplastic type of glues effective in securing wood to wood may be employed. As a specific example, a cold setting resin glue of the urea formaldehyde type may be used. A coating of the adhesive is applied to the exposed surface of the shim or part 24, or both, and these parts suitably pressed together. The pressure and intimate contact required to adhesively attach this assembly is not of the high type required for directly adhering the washer to the shim by a heat curing cement.

As indicated more particularly in Fig. 5, the necks 26 are not secured to the member 24 but are spaced therefrom. These necks serve to increase the stretch of the members 23 under load in order to permit that deflection of the wood member 24 which must occur within the length of the lap for the wood to pick up the load. Going from the end of the wood member 24 at the left, as viewed in Fig. 2, the proportion of the total load carried by the member 24 increases and that carried by the members 23 decreases until at the end of the members 23 the member 24 takes the entire load. Hence, at each successive neck the stretch of the constant section wood must be greater and the neck area is reduced so that even at its reduced load its stretch may equal that of the wood. The pads 25 constitute load transmitting connections between the members of the joint and the necks 26 serve as a deformable connection between adjacent pads.

The structure of Figs. 6 and 7 is similar to the above, differing therefrom only in that wood filler blocks 31 are positioned in the space provided at 27 by removing portions of the members 23, the blocks being glued to the member 24, as shown in Fig. 7, and serve to resist relative separation of the members under load.

Referring to Fig. 8, the invention is embodied in an overlapping joint between members 32, for example wood, having the same modulus of elasticity. Each member 32 at the overlap decreases in thickness in the direction of the free end thereof included in the joint so that each overlapped part increases in elastic deformability at successive cross sections, in the foregoing direction, conforming to the decreasing stress applied at said sections. In this manner the film of adhesive or bonding agent 33 between the overlapped parts is uniformly stressed at each cross section of the joint.

In the form of the invention shown in Figs. 9 and 10, each of the pair of members 23' associated with the wood member 24' has circularly shaped portions 34 removed therefrom, such removed portions progressively increasing from a minimum at the left of the joint, as viewed in Fig. 9, to a maximum at the other end of the joint. The removed portions are in rows transversely of the joint at locations spaced longitudinally of the latter. That part 35 of each member 23' intermediate adjacent rows is secured to the wood member 24' in the manner set forth in connection with the Fig. 1 embodiment and constitutes load transfer pads while the portions of each member 23' intermediate the portions 34 of each row are free to deflect relative to the member 24'. In this manner each member 23' has an increasing degree of deflection from left to right as viewed in Fig. 9.

In Figs. 11 and 12, each member 23'' has portions 36 thereof removed, providing necks 37 which are free for deflection relative to the member 24' and load transfer pads at the locations indicated at 38 which are secured to the member 24' in the manner set forth in connection with the Fig. 1 embodiment. It will be noted that the necks 37 progressively increase from a maximum area at the left end of the joint, as viewed in Fig. 11, to a minimum at the right end thereof. This variation in area permits increased deflection of the members 23'' so as to permit that deflection of the member 24' as the latter progressively picks up the load from the members 23''.

Referring to Figs. 13 and 14, the invention is embodied in an overlapping joint between metallic members 39 bonded together by a suitable medium 40 at locations spaced longitudinally of the overlap, as shown more particularly in Fig. 14. Each member 39 intermediate the points of attachment 40 is corrugated as indicated at 41 to increase the deflection thereof longitudinally of the joint relative to the other member. The number of corrugations at 41 of each member 39 progressively increases from a maximum adjacent the free end thereof included in the joint to a minimum toward the free end of the other member included in the joint. In this manner each member 39 has its maximum deflection at the free end thereof included in the joint and the difficulties encountered in a joint of the type shown in Fig. 1a are avoided and the stress to which the bonding medium 40 is subjected is of the same value at all portions of the joint.

I claim:

1. In a joint forming a load transmitting connection between members having overlapping parts, the overlapping part of one of said members having successive portions of uniform areas spaced one from the other in the direction of the longitudinal axis of said one member and bonded to the other of said members, and a connection between each pair of said successive bonded load transmitting portions integral therewith and freely deflectable relative to said other member, each of said load transmitting connections being of uniform thickness at successive cross-sections thereof and said connections diminishing in area from a maximum at one end of the overlap to a minimum at the opposite end of the overlap.

2. In a joint forming a load transmitting connection between members having overlapping parts, the overlapping part of one of said members being of uniform thickness at successive cross-sections thereof including a plurality of interconnected pads spaced in the direction of the longitudinal axis of said one member, an area of each of said pads substantially equal to the area of each of the other of said pads being bonded to the overlapping part of the other of said members, the connection between pads being free for deflection relative to said other member, said connections progressively decreasing in area from a maximum to a minimum intermediate the ends of the overlap.

3. In a joint forming a load transmitting connection between members arranged in overlapping relation, the overlap of said members including registering opposed sections spaced one from the other longitudinally of the overlap, an adhesive bonding surfaces of said sections together operable to transfer load between said parts, said overlap further including relative elastically deformable registering sections arranged alternately with respect to said bonded sections operable to transmit load between the latter, successive relatively elastically deformable sections of one of said parts decreasing in area from a maximum at one end of the overlap to a minimum at the other end of the overlap.

4. In a joint forming a load transmitting connection between members arranged in overlapping relation, the overlap of said members including registering opposed sections spaced one from the other longitudinally of the overlap, an adhesive bonding surfaces of said sections together operable to transfer load between said parts, said overlap further including relative elastically deformable registering sections arranged alternately with respect to said bonded sections operable to transmit load between the latter, successive relatively elastically deformable sections of one of said parts decreasing in area from a maximum at one end of the overlap to a minimum at the other end of the overlap, and successive relatively movable sections of the other of said parts increasing from a minimum at said one end of the overlap to a maximum at said other end of the overlap.

5. In a joint forming a connection between a wooden member and a metallic member having overlapping parts, said metallic part including spaced selected portions of uniform area respectively registering with portions of said wooden part, an adhesive bonding said registering portions together operable to transmit load between said parts, and a load transmitting connection between adjacent of said selected portions having an area less than the area of said adjacent sections elastically deformable relative to said wooden part accommodating deflection of said wooden part during transfer of load between said parts.

6. In a joint forming a load transmitting connection between members having parts thereof arranged in overlapping relation, one of said parts including portions of uniform area spaced one from the other in the direction of the load applied to the joint and so surface bonded to respective registering portions of the other of said members as to transmit load between said members, parts of said one member intermediate successive adjacent bonded portions being so removed as to form spaced opposed gaps between said adjacent portions and a load transmitting neck connecting said adjacent portions and deflectible relative to said other member.

7. In a joint forming a load transmitting connection between a metallic member and a wooden member having overlapped parts, wooden shims surface bonded to registering areas of said parts spaced one from the other in the direction of the longitudinal axis of the overlap operable to transfer load between said parts, said overlap further including relatively movable areas arranged alternately with respect to said bonded areas operable to transmit load between the latter and to accommodate relative deflection of said parts intermediate said bonded areas.

8. A composite article including a metallic member and a wooden member having overlapping parts, said metallic member having selected portions of uniform area spaced one from the other in the direction of the load applied to said parts surface bonded to said wooden member and including a load transmitting connection between adjacent selected areas deflectible relative to said wooden part, each of said load transmitting connections being of uniform thickness at successive cross-sections thereof and connections successively decreasing in area from a maximum at one end of the overlap to a minimum at the opposite end of the overlap.

9. A composite article including a metallic member and a wooden member having overlapping parts, said metallic member having a portion thereof adapted to receive load to be transmitted to said wooden member, said metallic member having selected uniform areas spaced one from the other in the direction of the load applied to said overlapped parts surface bonded to said wooden member, and including a load transmitting connection between adjacent selected areas having an area less than that of said adjacent selected areas, freely deflectible relative to said wooden part, successive connections decreasing in area from a maximum at the selected area adjacent said load receiving portion to a minimum at the selected area remote from the latter portion.

MAURICE B. HEFTLER.

REFERENCES CITED

The following references are of record in the file of this patent:

UNITED STATES PATENTS

| Number | Name | Date |
|---|---|---|
| 2,118,522 | Pitman | May 24, 1938 |
| 1,528,894 | Schmid et al. | Mar. 10, 1925 |

FOREIGN PATENTS

| Number | Country | Date |
|---|---|---|
| 98,968 | Swiss | of 1923 |

OTHER REFERENCES

Holz als Rohund Werkstoff, Sept. 1938, pages 460 to 464. (Copy in Division 33.)

---

Certificate of Correction

Patent No. 2,415,881.   February 18, 1947.

MAURICE B. HEFTLER

It is hereby certified that error appears in the printed specification of the above numbered patent requiring correction as follows: Column 5, lines 56 and 57, claim 1, strike out "load transmitting" and insert the same in line 55, same claim, before "connection"; and that the said Letters Patent should be read with this correction therein that the same may conform to the record of the case in the Patent Office.

Signed and sealed this 12th day of August, A. D. 1947.

[SEAL]

LESLIE FRAZER,
*First Assistant Commissioner of Patents.* commodate relative deflection of said parts intermediate said bonded areas.

8. A composite article including a metallic member and a wooden member having overlapping parts, said metallic member having selected portions of uniform area spaced one from the other in the direction of the load applied to said parts surface bonded to said wooden member and including a load transmitting connection between adjacent selected areas deflectible relative to said wooden part, each of said load transmitting connections being of uniform thickness at successive cross-sections thereof and connections successively decreasing in area from a maximum at one end of the overlap to a minimum at the opposite end of the overlap.

9. A composite article including a metallic member and a wooden member having overlapping parts, said metallic member having a portion thereof adapted to receive load to be transmitted to said wooden member, said metallic member having selected uniform areas spaced one from the other in the direction of the load applied to said overlapped parts surface bonded to said wooden member, and including a load transmitting connection between adjacent selected areas having an area less than that of said adjacent selected areas, freely deflectible relative to said wooden part, successive connections decreasing in area from a maximum at the selected area adjacent said load receiving portion to a minimum at the selected area remote from the latter portion.

MAURICE B. HEFTLER.

REFERENCES CITED

The following references are of record in the file of this patent:

UNITED STATES PATENTS

| Number | Name | Date |
| --- | --- | --- |
| 2,118,522 | Pitman | May 24, 1938 |
| 1,528,894 | Schmid et al. | Mar. 10, 1925 |

FOREIGN PATENTS

| Number | Country | Date |
| --- | --- | --- |
| 98,968 | Swiss | of 1923 |

OTHER REFERENCES

Holz als Rohund Werkstoff, Sept. 1938, pages 460 to 464. (Copy in Division 33.)

---

Certificate of Correction

Patent No. 2,415,881. February 18, 1947.

MAURICE B. HEFTLER

It is hereby certified that error appears in the printed specification of the above numbered patent requiring correction as follows: Column 5, lines 56 and 57, claim 1, strike out "load transmitting" and insert the same in line 55, same claim, before "connection"; and that the said Letters Patent should be read with this correction therein that the same may conform to the record of the case in the Patent Office.

Signed and sealed this 12th day of August, A. D. 1947.

[SEAL]

LESLIE FRAZER,
*First Assistant Commissioner of Patents.*